UNITED STATES PATENT OFFICE.

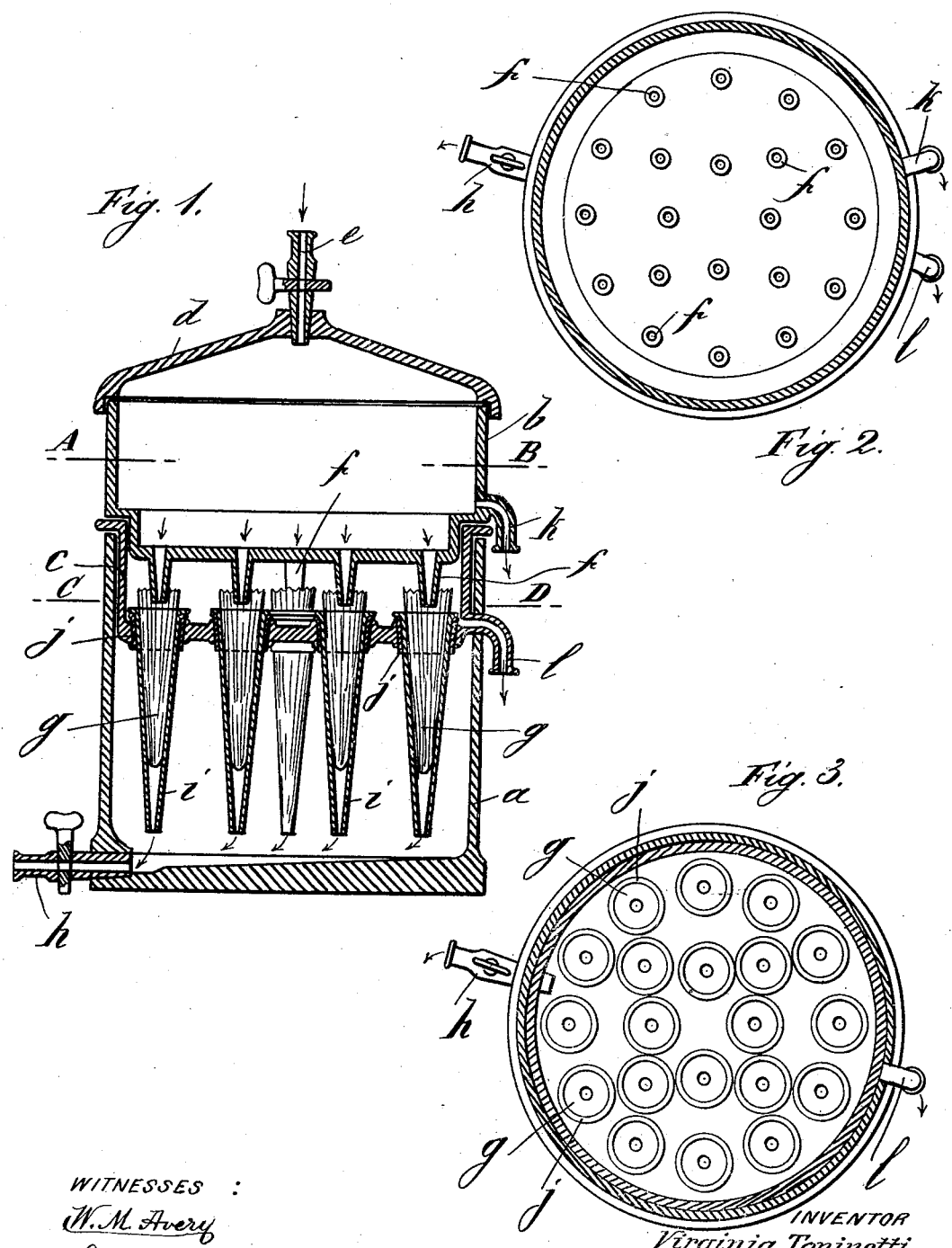

VIRGINIA TONINETTI, OF MILAN, ITALY.

FILTER.

No. 902,349.   Specification of Letters Patent.   Patented Oct. 27, 1908.

Application filed February 18, 1907. Serial No. 357,874.

*To all whom it may concern:*

Be it known that I, VIRGINIA TONINETTI, a subject of the King of Italy, residing at Milan, Italy, have invented new and useful Improvements in Filters, of which the following is a specification.

The improved filter which constitutes the present invention is shown in the annexed drawing by way of example.
Figure 1 is a vertical section of a complete filter constructed according to the present invention; Fig. 2 is a section on line A B of Fig. 1; Fig. 3 is a section on line C D of Fig. 1.
The apparatus is composed of a lower vessel $a$ destined to receive the filtered liquid, of an upper distributing vessel $b$ and of a middle vessel $c$, mounted one upon the other.

Upon the vessel $b$ a cover $d$ is disposed, which is provided with an admission cock $e$.

The liquid to be filtered is introduced into the upper vessel $b$, and passes through the conical holes $f$ at its bottom, so that it divides itself into the ordinary paper filters $g$ supported by the middle vessel $c$; the filtered liquid gathers on the bottom of the vessel $a$ and is discharged through the cock $h$.

The paper filters $g$ are placed inside conical glass supports $i$, inserted in holes in the bottom of the vessel $c$, and are surrounded by packings $j$ of india-rubber or any other suitable substances, which make the passages watertight.

The use of the conical glass supports surrounding the paper filters $a$, permits of the substitution of new filters, should the paper filters get torn or any other accident happen.

In order to facilitate the introduction of the small cones $f$ of the vessel $b$ into the paper filters, the latter, near their upper edge, are provided with a socket of unoxidizable metal for the purpose of keeping the mouth of the filters open.

Each of the vessels $b$ and $c$ are provided with an outlet pipe $k$ and $l$ respectively, the purpose of which is to allow the liquid to flow out, in case that through carelessness the cock $h$ should not have been opened. The discharge of the liquid through these two pipes serves as warning signal of the irregular working of the apparatus.

With this system the breaking of a paper filter happens only very seldom. However, if this should happen, the attendant would notice it immediately; he would close the inlet cock $e$ and the outlet cock $h$, thus avoiding the possibility of the liquid to be filtered mixing up with the filtered liquid.

Having thus described my invention, what I claim and desire to secure by Letters Patent, is:

1. A filter comprising a plurality of vessels arranged one upon the other, the upper vessel having tubular outlets projecting from its bottom, and a plurality of conical holders for filtering material supported in the lower vessel below the tubular outlets of the upper vessel.

2. A filter comprising a plurality of vessels supported one upon the other, the upper vessel having a plurality of conical outlets projecting from its bottom, and a plurality of removable conical holders for paper filters supported in the lower vessel below the conical outlets of the upper vessel.

3. A filter comprising three vessels supported one upon the other, the upper one having a plurality of conical outlets projecting from its bottom, and the intermediate one provided with a plurality of removable supports for paper filters, said supports being in alinement with the outlets of the upper vessel.

4. A filter comprising three vessels supported one upon the other, the lower vessel having a discharge cock, the upper one having an inlet in its cover and provided with conical outlets projecting from its bottom and with an outlet pipe leading from its side, and the intermediate one having a plurality of removable conical holders for paper filters in alinement with the outlets of the upper vessel and an outlet pipe leading from one side.

5. In a filter, three vessels supported one upon the other, the upper one having outlets in its bottom, and the intermediate one carrying a plurality of holders for filtering material, the upper and intermediate vessels each being provided with an outlet pipe leading out through the side thereof.

In testimony whereof I have signed my name to this specification in the presence of two subscribing witnesses.

VIRGINIA TONINETTI.

Witnesses:
ERNEST SANTI,
MARTI VALOOKI.